United States Patent
Dostal et al.

(10) Patent No.: US 9,335,917 B2
(45) Date of Patent: May 10, 2016

(54) SYSTEM AND METHOD FOR PROVIDING ENHANCED HMI NAVIGATION

(71) Applicant: HONEYWELL INTERNATIONAL INC., Morristown, NJ (US)

(72) Inventors: Martin Dostal, Olomouc (CZ); Jiri Vasek, Brno (CZ); Matej Papp, Trnavsky (SK)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/299,197

(22) Filed: Jun. 9, 2014

(65) Prior Publication Data

US 2015/0355832 A1    Dec. 10, 2015

(51) Int. Cl.
| G01C 23/00 | (2006.01) |
| G06F 3/0485 | (2013.01) |
| G01C 21/00 | (2006.01) |
| G06F 3/0484 | (2013.01) |

(52) U.S. Cl.
CPC ............ *G06F 3/04855* (2013.01); *G01C 21/00* (2013.01); *G01C 23/00* (2013.01); *G06F 3/04842* (2013.01); *G06F 3/04847* (2013.01)

(58) Field of Classification Search
CPC .............................. G08G 5/003; G08G 5/0047
USPC ............................................................ 701/3
See application file for complete search history.

(56) References Cited

U.S. PATENT DOCUMENTS

| 7,765,061 | B1 | 7/2010 | Barber et al. |
| 8,471,727 | B2 | 6/2013 | Batsakes et al. |
| 2009/0109065 | A1 | 4/2009 | Pinheiro |
| 2010/0153875 | A1 | 6/2010 | O'Flynn et al. |
| 2011/0010082 | A1* | 1/2011 | Wilson ............ G01C 23/00 701/532 |
| 2012/0035849 | A1 | 2/2012 | Clark et al. |
| 2012/0147030 | A1* | 6/2012 | Hankers et al. ............ 345/619 |
| 2012/0232785 | A1 | 9/2012 | Wiesemann et al. |
| 2013/0268878 | A1 | 10/2013 | Le Roux et al. |
| 2014/0156114 | A1 | 6/2014 | Aymeric et al. |

FOREIGN PATENT DOCUMENTS

FR        2984486 A1    6/2013

OTHER PUBLICATIONS

Extended EP Search Report for EP 15168543.5-1557 dated Oct. 16, 2015.

* cited by examiner

*Primary Examiner* — Michael D Lang
(74) *Attorney, Agent, or Firm* — Ingrassia Fisher & Lorenz, P.C.

(57) ABSTRACT

A method and apparatus is provided for enhancing an HMI (Human Machine Interface) mechanism to include continuous, sequential, and time-based navigation capabilities. Airspace data associated with a flight plan is received, and the airspace data associated with a region of the flight plan is displayed. A time scale substantially coextensive with the region is also displayed. To view a future region of the airspace, the time scale on the display is moved in a first direction, and to view a previous region, the time scale on the display is moved in a second, substantially opposite direction.

18 Claims, 6 Drawing Sheets

SYSTEM AND METHOD FOR PROVIDING ENHANCED HMI NAVIGATION

TECHNICAL FIELD

The present invention relates generally to avionics display systems and, more particularly, to an avionics display system and method for providing an enhanced HMI (Human Machine Interface) mechanism including continuous, sequential, and time-based navigation capabilities.

BACKGROUND

A pilot is faced with two major tasks; i.e. (1) to accurately determine and remain constantly aware of the current aircraft status including direction, speed, altitude, location and the rates of change of each; and (2) to quickly and accurately control the aircraft to effectuate a change in these parameters to achieve a desired status of the aircraft including, for example, setting or altering the aircraft's flight-plan.

To this end, avionics display systems deployed aboard aircraft has been extensively engineered to visually convey a considerable amount of flight information in an intuitive and readily comprehendible manner. In conventional avionics display systems, much of the information visually expressed on a cockpit display, (e.g., a primary flight display, a horizontal map display, a vertical situation display, etc.) pertains to aircraft parameters (e.g., the heading, drift, roll, and pitch of the host aircraft), nearby geographical features (e.g., mountain peaks, runways, etc.), and current weather conditions (e.g. developing storm cells). A further improvement occurred with the introduction of flight management systems, a type of specialized computer that includes a database of pre-stored navigation landmark, such as an airport, or may represent an imaginary intersection (a waypoint) in the sky.

In addition, pilots strive to create a precise picture of future situations using information that is currently available to them such as weather reports and forecasts, pilot reports, NOTAM (Notice to Airmen), information about other air traffic, and the like. Such information useful for strategic decision making inherently includes a temporal component, which may be closely associated with a location e.g. (e.g., What will the situation look like in 20 minutes at a specific location?).

The management of strategic information and optimal situational awareness are important topics in and among the aerospace industry. For example, strong emphasis has been placed on this in the development of the FAA's Next Generation Air Transportation System (NextGen) and its European counterpart Single European Sky ATM Research (SESAR), which are parallel projects intended to completely overhaul their respective airspace and air traffic management. For example, NextGen will comprise 1) automatic dependent surveillance-broadcast (ADS-B) incorporating GPS satellite signals to provide air traffic controllers and pilots with much more accurate information to help keep aircraft safely separated in the sky and on runways, (2) providing aircraft and ATM with data-link communications for traffic control clearances, instructions, and advisories improving controller productivity, enhancing capacity, and increasing safety, (3) reduce weather-related delays by half by providing a common weather picture across the national airspace thus enabling better decision making, and (4) replacing the multiple different voice switching systems that have been in use for many years with a single air/ground and ground/ground voice communications system.

Currently, strategic decision-making is supported by many information sources, some of them including navigation service providers (ANSP), airline operation centers. Others include various applications installed, for example, on electronic flight bags (EFBs). Commonly, such applications require the flight crew to connect information from various devices; for example, integrating information disseminated as NOTAMs, published activation of restricted airspaces, and/or weather information with an estimate of future position. This is time-consuming and requires a significant amount of cognitive resources; e.g., navigation mechanisms are supported by pull-down menus, toolbars, dialog boxes, etc. Thus, providing each piece of information individually without a broader context does not enhance the temporal or local aspects of the information provided.

In view of the foregoing, it would be desirable to provide an enhanced HMI navigation mechanism that includes function selection that are continuous (i.e. temporal), sequential (i.e. flight phase and waypoints), and time-based (i.e. past, present, and future). It would also be desirable to provide an enhanced HMI navigation mechanism that can be operated consistently across all strategic functions and applications in the HMI environment (e.g., an EFB utilizing many strategic applications). In this manner, temporal navigation associated with a location is integrated into the graphical user interface environment of a strategic decision support tool improving usability by increasing comfort, reducing workload, and increasing efficiency when making strategic decisions.

It would further be desirable to provide an enhanced HMI navigation mechanism that (1) is not limited to displaying weather or forecast information in general, but can also display time and position related data such as NOTAMs, predictions, and estimations, (2) does not merely switch between present and future information but provides sequential and continuous navigation from past, through present to future, (3) is reusable and consistent when manipulating timeline information, and (4) provides a moving-to-the-future capability that enables to see how things will look (e.g., remaining fuel estimate at a future point of interest) and a moving-to-the-past capability (e.g., previous weather trends as they relate to current and/or future position).

It would still further be desirable to provide a time-screen structure wherein the screen comprises a menu-bar for selecting a function, a canvas area for displaying application-dependent content, a feedback area, a home button, and a timeline widget that controls what is displayed and provides time-based navigation for the currently selected task/function by moving the visible timeframe of the flight forward and backward.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Described herein is method for providing HMI navigation. The method comprises receiving airspace data associated with a flight plan and displaying on a display the airspace data associated with a region of the flight plan. A time scale substantially coextensive with the region is also displayed. Sliding the time scale on the display in a first direction to displays a future region, and sliding the time scale on the display in a second, substantially opposite direction displays a previous region. Sliding the time scale to the current position (time)

results in current data being displayed. Thus, it is possible to display past data (e.g., logged data), present data (e.g., currently monitored data), and future data (e.g., data from a forecast model).

Also described herein is an avionics display system for deployment onboard an aircraft that includes an interactive display. The system comprises a display, a first source of flight plan data, and a second source of airspace data in the vicinity of the flight plan. A processor is coupled to the display, the first source and the second source and is configured to (a) generate symbology graphically representative of a flight plan segment, (b) display the airspace associated with the segment of the flight plan, (c) display a time scale substantially coextensive with the segment, (d) slide the time scale on the display in a first direction to view a future segment, and (e) slide the time scale on the display in a second, substantially opposite direction to view a previous segment.

Also provided is a method for providing HMI navigation. The method comprises receiving airspace data associated with a flight plan, displaying on a display the airspace data associated with a region of the flight plan, displaying a time scale substantially coextensive with the region, and displaying a handle on the time scale. Sliding the handle on the time scale in a first direction enables viewing of a future region, and sliding the handle on the time scale in a second, substantially opposite direction to enables viewing of a previous region.

BRIEF DESCRIPTION OF THE DRAWINGS

Embodiments of the subject matter will hereinafter be described in conjunction with the following drawing figures, wherein like numerals denote like elements.

DETAILED DESCRIPTION

Figure 1:
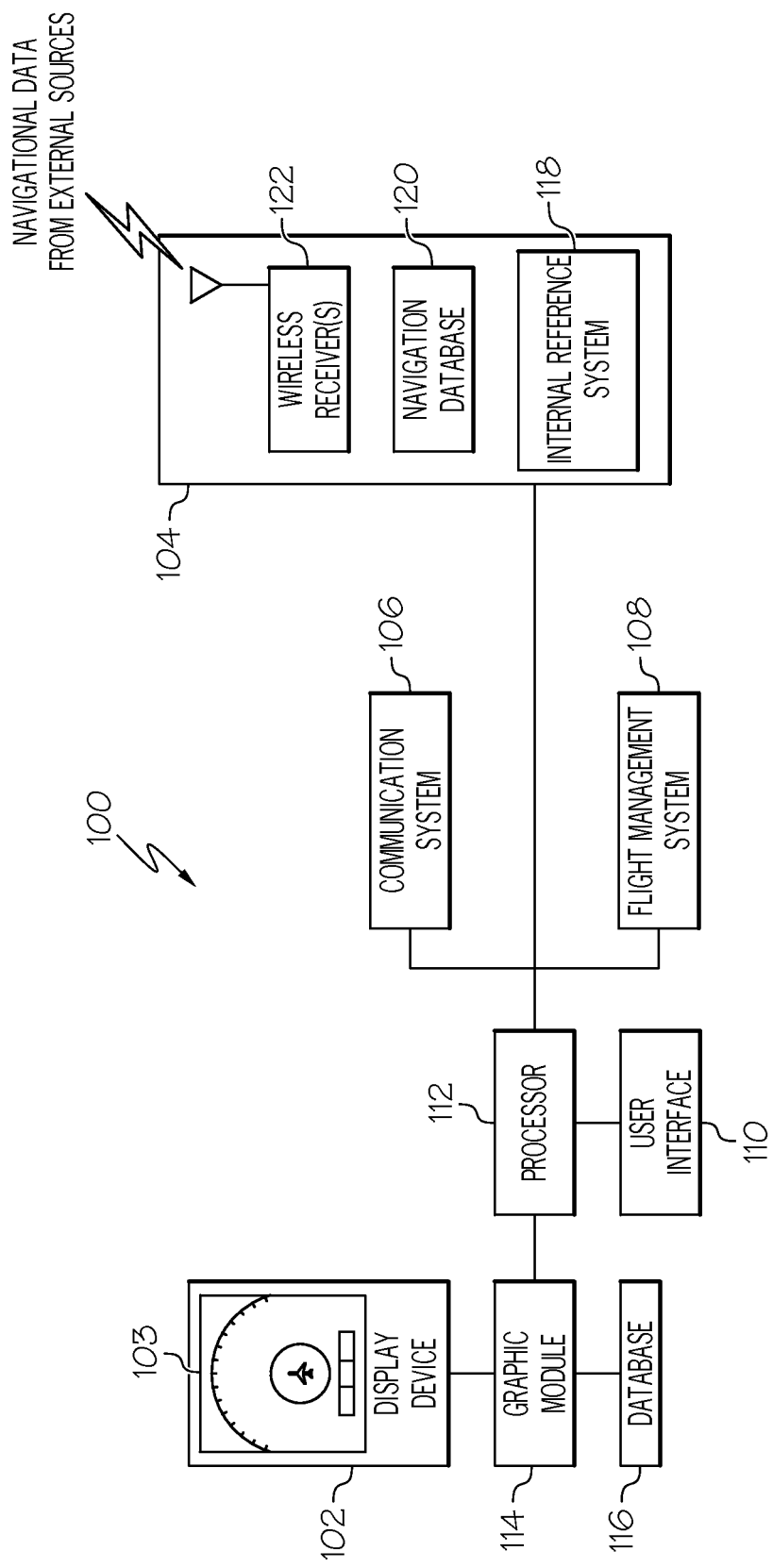
FIG. 1 is a block diagram of an information display system suitable for use in an aircraft in accordance with an embodiment.

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how a flight course may be graphically generated. For example, a graphical generation of waypoints and altitude constraints will be discussed. However, it should be appreciated that this explicated example embodiment is merely an example and a guide for implementing the novel display system and method. As such, the examples presented herein are intended as non-limiting..

Techniques and technologies may be described herein in terms of functional and/or logical block components and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to interactive display systems adapted for displaying, on a display device associated with an aircraft and adjusting the track (or path) defined by a flight plan (or travel route). A user can quickly and intuitively create a new waypoint or insert an altitude constraint on or into an existing flight plan. The overall workload on the user is reduced and the graphical adjustment is implemented in a manner that improves situational awareness. Although the subject matter is described herein in an aviation context, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to an aviation environment.

FIG. 1 depicts an exemplary embodiment of an interactive display system 100, which may be located onboard a vehicle such as an aircraft. In an exemplary embodiment, the display system 100 includes, without limitation, a display device 102 for displaying a graphical flight plan image 103, a navigation system 104, a communications system 106, a flight management system (FMS) 108, a processor 112, a graphics module 114, a user interface 110 (e.g. a cursor control device), and a database 116 suitably configured to support operation of the graphics module 114 and display device 102 (e.g. a touchscreen), as described in greater detail below. Navigation system 104 may include an inertial reference system 118, a navigation database 120 and one or more wireless receivers 122 for receiving navigational data from external sources in the well-known manner.

It should be understood that FIG. 1 is a simplified representation of an interactive display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the processor 112 for obtaining and/or providing real-time flight-related information that may be displayed on the display device 102.

In an exemplary embodiment, the display device 102 is coupled to the graphics module 114. The graphics module 114 is coupled to the processor 112, the display 102, and database 116 are cooperatively configured to display, render, or otherwise convey one or more graphical representations or images such as a flight plan associated with operation of the aircraft on the display device 102.

As stated previously, navigational system 104 includes an inertial reference system 118, a navigation database 120, and at least one wireless receiver 122. Inertial reference system 118 and wireless receiver 122 provide processor 112 with navigational information derived from sources onboard and external to the host aircraft, respectively. More specifically, inertial reference system 118 provides processor 112 with information describing various flight parameters of the host aircraft (e.g., position, orientation, velocity, etc.) as monitored by a number of motion sensors (e.g., accelerometers, gyroscopes, etc.) deployed onboard the aircraft. By comparison, and as indicated in FIG. 1, wireless receiver 122 receives navigational information from various sources external to the aircraft. These sources may include various types of navigational aids (e.g., global position systems, non-directional radio beacons, very high frequency Omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 stores a considerable amount of information useful in flight planning. For example, navigation database 120 can contain information pertaining to the geographical location of waypoints and lists of available approaches that may be flown by an aircraft when landing at a particular runway. During flight planning, a pilot may utilize user interface 110 to designate a desired approach from a list of available approaches stored in navigational database 120. After the pilot designates the desired approach, processor 112 may then recall from navigational database 120 relevant information pertaining to the designated approach.

Processor 112 is coupled to navigation system 104 for obtaining real-time navigational data and/or information regarding operation of the aircraft to support operation of the display system 100. In an exemplary embodiment, the communications system 106 is coupled to the processor 112 and configured to support communications to and/or from the aircraft, as is appreciated in the art. The processor 112 is also coupled to the flight management system 108, which in turn, may also be coupled to the navigation system 104 and the communications system 106 for providing real-time data and/or information regarding operation of the aircraft to the processor 112 to support operation of the aircraft. In an exemplary embodiment, the user interface 110 (e.g. touchscreen or cursor control) is coupled to the processor 112, and the user interface 110 and the processor 112 are cooperatively configured to allow a user to interact with display device 102 and other elements of display system 100, as described in greater detail below.

In an exemplary embodiment, the interactive display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the remainder of display system 100 and enables a user to indicate, select, or otherwise manipulate content displayed on the display device 102, as described in greater detail below. In various embodiments, the user interface 110 may be realized as a keypad, touchpad, keyboard, cursor control, touchscreen, joystick, knob, microphone, or another suitable device adapted to receive input from a user. In preferred embodiments, user interface 110 may be a touchscreen, cursor control device, joystick, or the like.

In an exemplary embodiment, the navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

In an exemplary embodiment, the flight management system 108 maintains information pertaining to a current flight plan (or alternatively, a current route or travel plan). In this regard, depending on the embodiment, the current flight plan may comprise either a selected or otherwise designated flight plan for subsequent execution, a flight plan selected for review on the display device 102, and/or a flight plan currently being executed by the aircraft. In this regard, as used herein, a flight plan should be understood as a sequence of navigational reference points that define a flight path or route for the aircraft. In this regard, depending on the particular flight plan and type of air navigation, the navigational reference points may comprise navigational aids, such as VHF Omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), points of interest or other features on the ground, as well as position fixes (e.g., initial approach fixes (IAFs) and/or final approach fixes (FAFs)) and other navigational reference points used in area navigation (RNAV). For example, a flight plan may include an initial or beginning reference point (e.g., a departure or takeoff location), a final navigational reference point (e.g., an arrival or landing location), and one or more intermediate navigational reference points (e.g., waypoints, positional fixes, and the like) that define the desired path or route for the aircraft from the initial navigational reference point to the final navigational reference point. In this regard, the intermediate navigational reference points may define one or more airways for the aircraft en route to the final navigational reference point.

As described in greater detail below, the along track distance (or length) of the flight plan comprises the sum of all of the straight line ground distances between adjacent navigational reference points of the flight plan; i.e. the total ground distance corresponding to the route defined by the plurality of navigational reference points comprising the flight plan. For example, if the flight plan comprises three navigational reference points, the along track distance (or length) of the flight plan is equal to the sum of the straight line ground distance between a location corresponding to the first navigational reference point and a location corresponding to the second navigational reference point and the straight line ground distance between the location corresponding to the second navigational reference point and a location corresponding to the third navigational reference point.

In some embodiments, the flight management system 108 may include a database that maintains a plurality of predefined flight plans, wherein a predefined flight plan from the database may be selected by a user via user interface 110 for use as the current flight plan. In another embodiment, the current flight plan may be uplinked via the communications system 106. Alternatively, the user may utilize the user interface 110 to manually enter or indicate the desired endpoints (e.g., the initial and final navigational reference points) for the current flight plan. Depending on the embodiment, the user may manually enter the intermediate navigational reference points (e.g., via user interface 110), or alternatively, the intermediate navigational reference points may be automatically generated by the flight management system 108 based on the endpoints (e.g., the initial and final navigational reference points) of the flight plan, as will be appreciated in the art. As described in greater detail below, in an exemplary embodiment, the processor 112 and/or graphics module 114 are configured to display and/or render symbology pertaining to the generation (1) new waypoints on an existing flight plan, and (2) an altitude constraint on a vertical situation display device.

The processor 112 generally represents the hardware, software, and/or firmware components configured to facilitate the display and/or rendering of a navigational map on the display device 102 and perform additional tasks and/or functions described in greater detail below. Depending on the embodiment, the processor 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processor 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processor 112, or in any practical combination thereof.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, a weather database, a flight plan database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Figure 2:
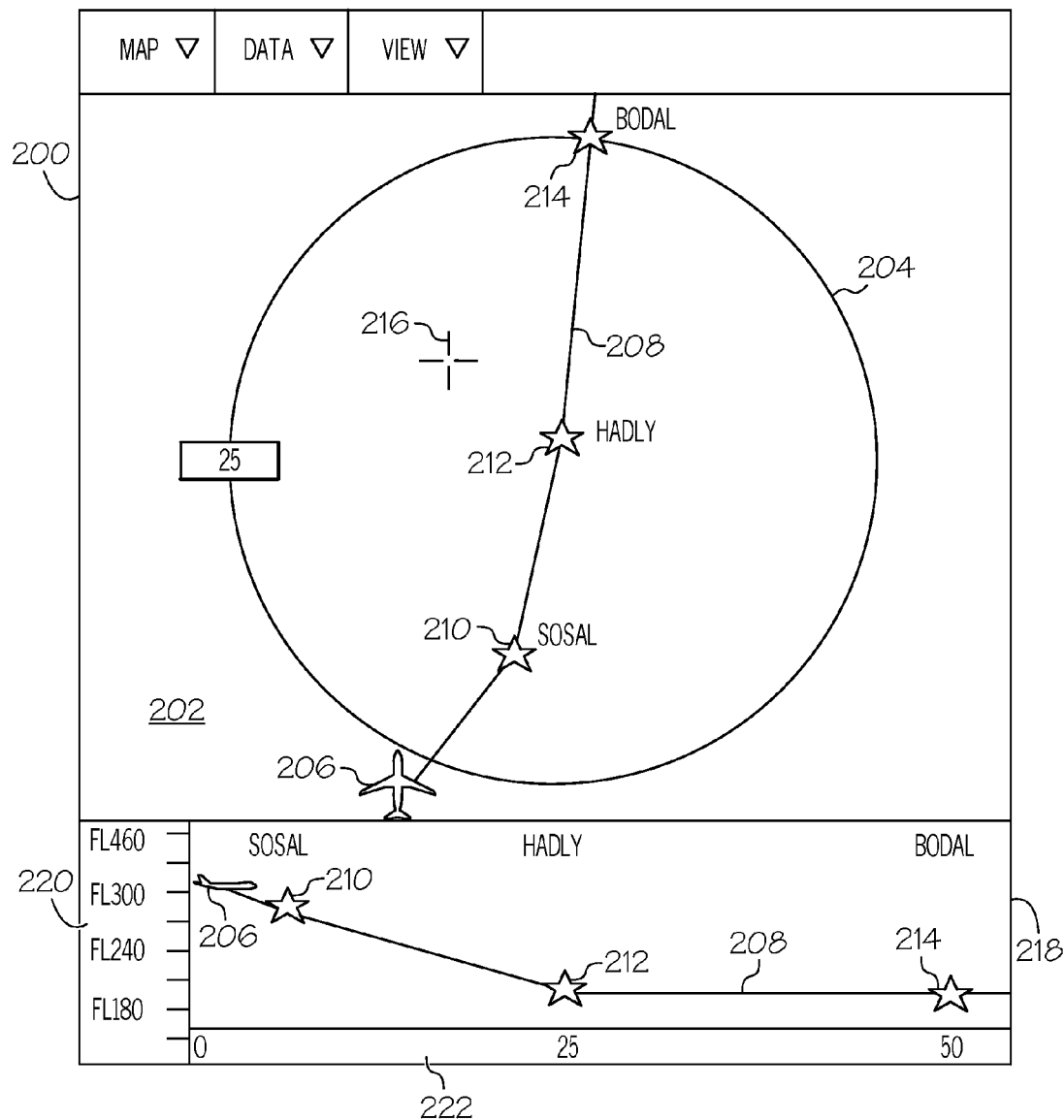
FIG. 2 is a graphical view of an exemplary navigational map display and a vertical situation display suitable for use with the information display system of FIG. 1.

FIG. 2 is an exemplary illustration of a graphical display comprising a navigational map 200 and an airspace overlay 202. The processor 112, database 116, and graphics module 114 (FIG. 1) nay be configured to render navigational map 200 to display terrain, topology, and other suitable items or points of interest within a given distance from the aircraft. The pilot may set the threshold distance of the viewable area by zooming-in to display a smaller geographic area or zooming-out to display a larger geographic area. The relative scale of the area is shown by a range ring 204 having a number "25' thereon indicating that the range of the range ring is twenty-five nautical miles. Referring to FIG. 2, map 200 suitably includes an aircraft indicator 206 on a flight path indicator 208, which shows the path to be flown by aircraft 206. The flight plan may be marked by a series of waypoints 210 (SOSAL), 212 (HADLY), and 214 (BODAL) on FIG. 2. Each waypoint may correspond to a navigational aid, an airport, or any other point on a map. The flight plan shown in FIG. 2, for example, shows the aircraft flying to waypoint SOSAL, then turning toward waypoint HADLY, and continuing on to waypoint BODAL. A typical flight plan image may be represented as a series of flight segments from waypoint to waypoint, terminating at a destination airport. Changes to the flight plan may be made by adding, removing or adjusting waypoints. It is known to accomplish this with a flight management system (FMS) and/or through graphical manipulation of the waypoints on the display by the pilot.

With continued reference to FIG. 2, it is also known to provide pilots with further options by permitting a pilot to activate options menus, which may be a pull-down window, and make selections. The pilot may activate a menu by pointing to a reference waypoint 214 with a cursor 214 and, for example, clicking. After the pilot activates the menu, a number of options are suitably presented to the pilot, who may choose an action associated with the particular waypoint. The pilot may position cursor 216 in the vicinity of an airspace of interest (or tap the airspace of interest of interest in the case of a touchscreen interface), to cause the desired airspace to be selected or visually distinguished; e.g., from a dashed line to a solid line, from a first color to a second color, from a thin line to a thick line, etc., and display the associated airspace data. Processor 112 (FIG. 1) may also be enabled to automatically select and display the airspace data upon entrance into the airspace.

Located below navigational map 200 is a vertical situation display (VSD) 218 further illustrating the airspace being entered or selected by a user. The selected airspace is displayed on VSD 218 in a manner consistent with how the airspace is displayed in map display 200. VSD includes a vertical altitude scale 220, a horizontal distance scale 222, and illustrates a vertical profile view of flight plan 208 including waypoints SOSAL, HADLY, and BODAL.

Figure 3:
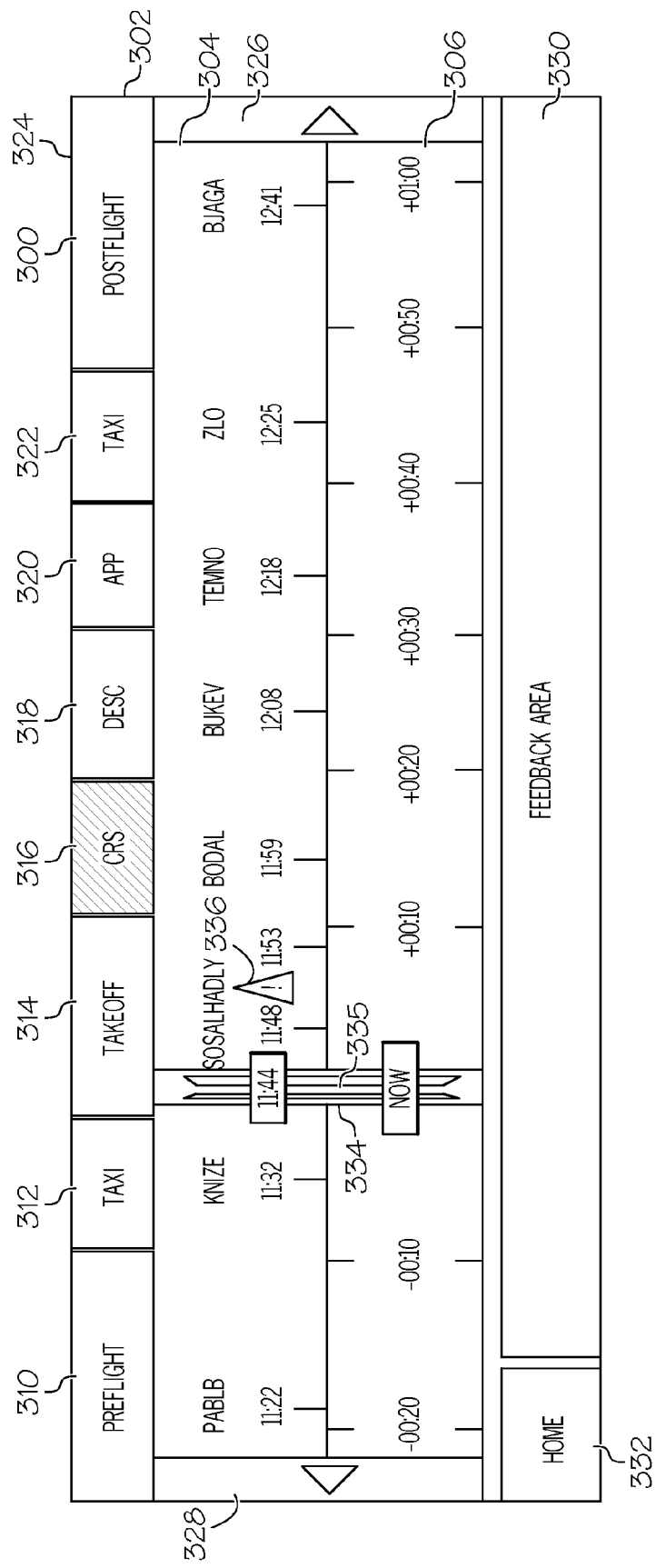
FIG. 3 illustrates an HMI navigation display mechanism in accordance with an exemplary embodiment.

FIG. 3 illustrates an HMI navigation display mechanism 300 in accordance with an exemplary embodiment. The mechanism includes a flight-phase indicator 302, a waypoint (WP) and estimated-time-of-arrival (ETA at that waypoint) or real time indicator 304, and a relative time scale 306. It can be seen that flight phase indicator includes a PREFLIGHT segment 310, a TAXI segment 312, a TAKEOFF segment 314, a CRS (cruise) segment 316 a DESC (descent) segment 318 APP (approach) segment 320, a TAXI segment 322, and a POSTFLIGHT segment 324, all together representing the entire flight. Segment 316 is visually distinguished to indicate that the flight is currently in the cruise segment. Waypoint and ETA indicator 304 shows that waypoints PABLB, KNIZE, SOSAL, HADLY, BODAL, BUKEV, TEMNO, ZLO, and BJAGA will be traversed by the flight, and the elapsed time will extend from before 11:22 until after 12:41. Relative time scale 306 display indicates the location of the flight in terms of elapsed time and remaining HMI navigation display mechanism 300 also includes a time-forward button 326, a time-backward button 328, a feedback area 330, a return-to-home button 332, and a current-time indicator 334. Current time indicator 334 is slidable in both forward and backward directions (i.e. in both time and place) by means of dragging a handle 335 with a cursor in the case of a cursor-controlled device or dragging the handle 335 with a finger or stylus in the case of a touchscreen device. Furthermore, the entire time scale can be controlled via a knob on the cursor controlled device or a finger sliding the whole time scale. A notification icon 336 is also shown in FIG. 2 and is used to display a time-related notification. A user may activate the icon 336 by clicking, tapping, or the like, and more information relating to the notification will be displayed.

Figure 4:
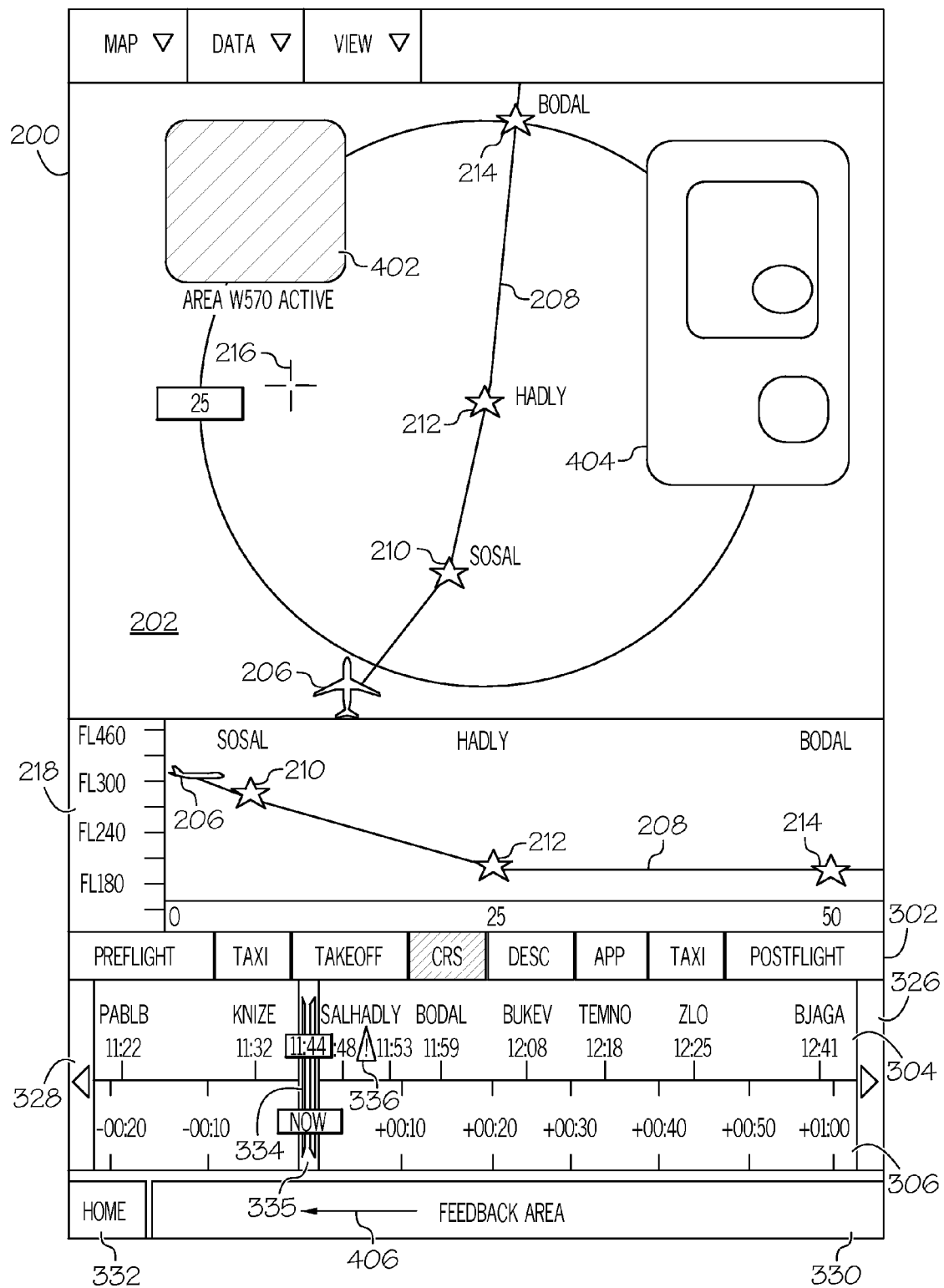
FIG. 4 depicts the navigation and vertical situation display shown and described in FIG. 2 having the HMI navigation display mechanism of FIG. 3 incorporated therewith in accordance with a first exemplary embodiment.

FIG. 4 illustrates the navigation and vertical situation display shown and described in connection with FIG. 2 having the HMI navigation display mechanism 300 incorporated therewith in accordance with a first exemplary embodiment. As can be seen, aircraft 206 is flying in the cruise segment (i.e. CRS 316 is highlighted) and following a path to WP SOSAL, continuing on to WP HADLY and then to WP BODAL. The crew detects (1) a temporarily restricted area 402 and (2) and a convection weather phenomena 404 that is active and to the left of flight plan 208. The flight crew may question what impact these have on the flight as it passes WP HADLY.

Figure 5:
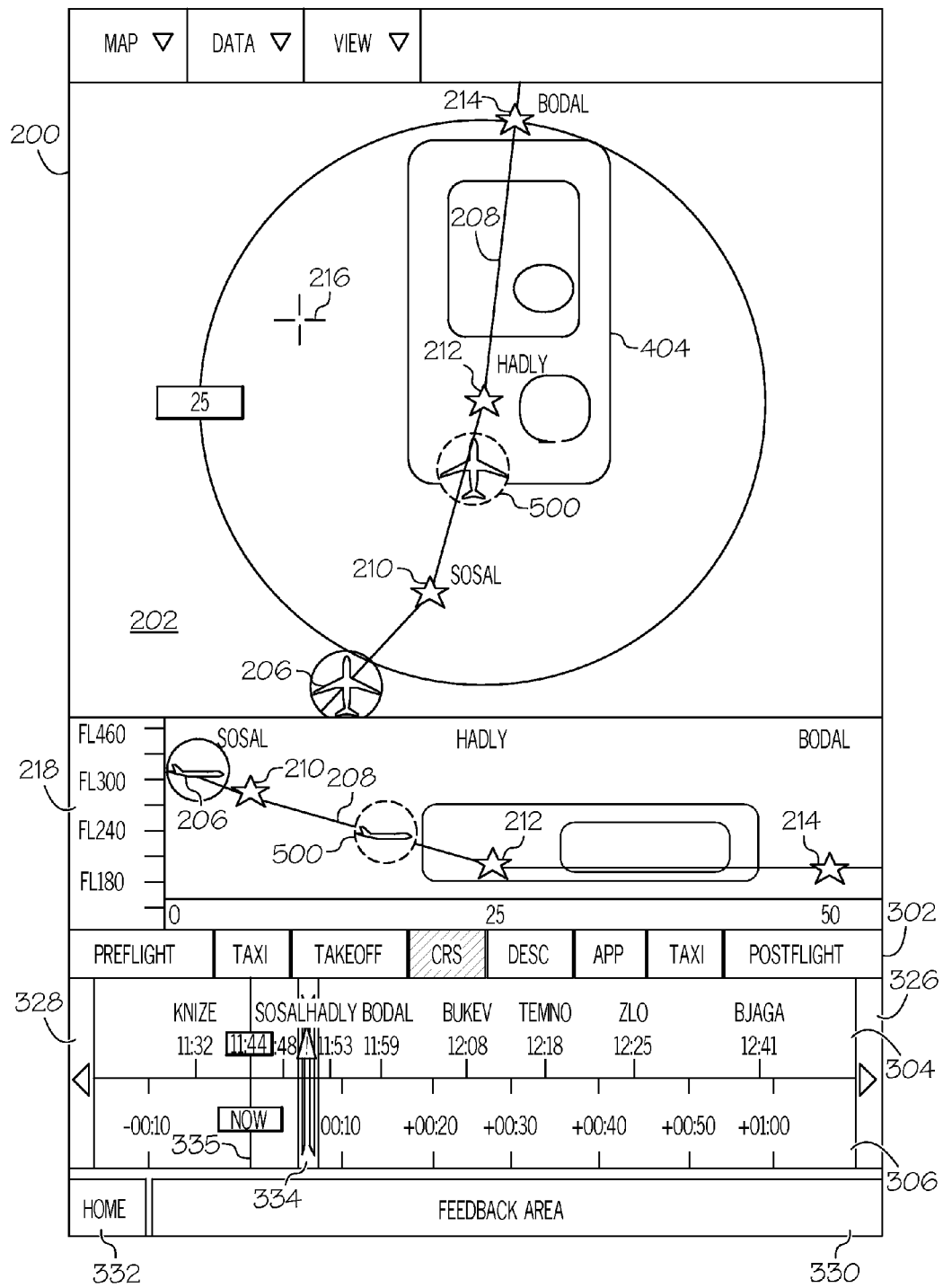
FIG. 5 depicts the navigation, vertical situation display, and HMI navigation display mechanism of FIG. 3 displaying a future weather scenario in accordance with an exemplary embodiment.

To help determine this, a crewmember may slide time indicator 334 to the left (as indicated by arrow 406) in order to see the future situation. This is illustrated in FIG. 5. After moving time indicator 334, the current aircraft position is depicted as a ghost aircraft 500 and begins moving along the flight path 208 until it reaches a location just prior to WP HADLY. Here, it becomes apparent that the temporarily restricted area 402 in FIG. 4 will be inactive when aircraft reaches WP HADLY, but there will however be severe convection by the time WP HADLY is reached. With this knowledge, the crew may decide to contact air traffic control and request rerouting in view of the weather.

Figure 6:
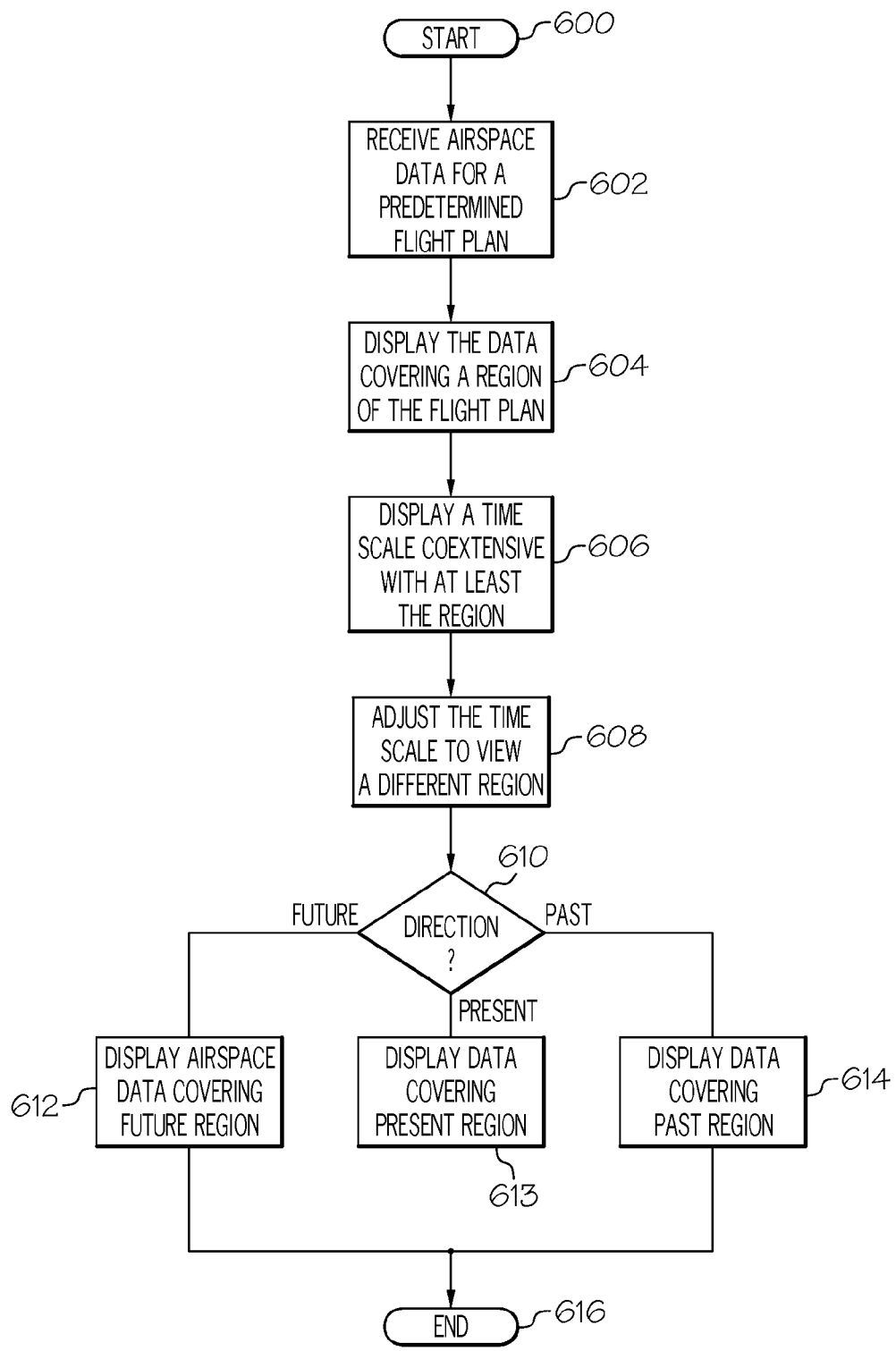
FIG. 6 is a flowchart of an interactive display process for providing enhanced HMI navigation in accordance with an exemplary embodiment and capable of being carried out by the system shown and described in connection with FIG. 1.

FIG. 6 is a flowchart of an interactive display process 600 for providing enhanced HMI navigation in accordance with an exemplary embodiment and capable of being carried out by the system shown and described in connection with FIG. 1. In STEP 602, airspace data (e.g. traffic, weather, range, etc.) associated with a flight plan is received, and the data associated with a predetermined region of the flight plan is displayed (STEP 604). A time/distance scale substantially coextensive with the region is also displayed (STEP 606). As shown in FIG. 3, the time scale may a relative time scale, an absolute time scale, a scale delineated by flight phase, and a scale delineated by reference points such as waypoints.

A slidable handle is provided on the displayed image to alter the region displayed (STEP 608). If a future time (region) is selected (STEP 612), the airspace data associated with the future region will be displayed. If a time (region) in the past is selected (STEP 614), the airspace data associated with the previous region will be displayed. If a current time (region) is selected (STEP 613), the airspace data associated with the current region will be displayed. When the appropriate region is displayed, the process ends (STEP 616). It is to be noted that the functions that are subject to the HMI navigation system may be continuous (i.e. temporal), sequential (i.e. flight phase, waypoints, etc.), or time-based (i.e. past, present, and future).

Thus, it should be appreciated that there has been provided a system and method for producing an HMI navigation mechanism that; is not limited to displaying forecast information but can also display time and position related data such as NOTAMs, predictions, and estimations; does not merely switch between present and future information and provides sequential and continuous navigation from past, through present to future; is reusable and consistent when manipulating timeline information, and (4) provides a moving-to-the-future capability that enables to see how things will look (e.g., remaining fuel estimate at a future point of interest); and provides a moving-to-the-past capability (e.g., previous weather trends as they relate to current and/or future position. While an exemplary embodiment of the present invention has been described above in the context of a fully functioning computer system (i.e., avionics display system 100), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing human machine interface (HMI) navigation, the method comprising:
    receiving airspace data associated with a flight plan, wherein the flight plan comprises phases of flight;
    displaying on a display the airspace data associated with a region of the flight plan;
    displaying a time scale substantially coextensive with the region, wherein the time scale comprises i) a waypoint and estimated time of arrival at the waypoint and ii) relative time;
    displaying, substantially coextensive with the time scale, a flight phase indicator comprising a segment associated with each phase of flight of the flight plan;
    sliding the time scale on the display in a first direction to view a future region; and
    sliding the time scale on the display in a second, substantially opposite direction to view a previous region.

2. The method of claim 1 wherein the steps of sliding are done by dragging a handle on the time scale.

3. The method of claim 2 wherein the step of dragging is performed with a cursor.

4. The method of claim 2 wherein the display is a touchscreen and the step of dragging is performed with a finger.

5. The method of claim 1 wherein the step of dragging is performed by manipulating a handle on the time scale.

6. The method of claim 1 wherein the time scale is represented by a series of waypoints.

7. The method of claim 1, further comprising visually distinguishing the current flight phase.

8. The method of claim 1, further comprising selecting a first button to move to the future and selecting a second button to move to the past.

9. The method of claim 1, further comprising visually highlighting a segment of the flight phase indicator associated with a current phase of flight.

10. The method of claim 9, wherein the phases of flight comprise, in sequence: preflight, taxi, takeoff, cruise, descent, approach, taxi, and postflight.

11. An interactive display system, comprising:
    a display;
    a first source of flight plan data comprising a flight plan having phases of flight;
    a second source of airspace data in the vicinity of the flight plan; and
    a processor coupled to the display, the first source, and the second source and configured to (a) generate symbology graphically representative of a region of the flight plan, (b) display the airspace associated with the region of the flight plan; (c) display a time scale substantially coextensive with the region, wherein the time scale comprises i) a waypoint and estimated time of arrival at the waypoint, ii) relative time, and iii) a flight phase indicator comprising a segment associated with each phase of flight of the flight plan; (d) slide the time scale on the display in a first direction to view a future region of the flight plan; and (e) slide the time scale on the display in a second, substantially opposite, direction to view a previous region of the flight plan.

12. The system of claim 11 wherein the time scale comprises a series of waypoints.

13. The system of claim 11, wherein the processor is further configured to generate symbology corresponding to a handle on the time scale for dragging the time scale on the display in a first direction to view a future region of the flight plan, and dragging the time scale on the display in a second, substantially opposite, direction to view a previous region of the flight plan.

14. The system of claim 11, wherein the processor is further configured to visually highlight a segment of the flight phase indicator associated with a current phase of flight.

15. The system of claim 14, wherein the phases of flight comprise, in sequence: preflight, taxi, takeoff, cruise, descent, approach, taxi, and postflight.

16. A method for providing human machine interface (HMI) navigation, the method comprising:
    receiving airspace data associated with a flight plan, wherein the flight plan comprises phases of flight;
    displaying on a display the airspace data associated with a region of the flight plan;
    displaying a time scale substantially coextensive with the region, wherein the time scale comprises i) a waypoint and estimated real time of arrival at the way point, ii) relative time, and iii) a flight phase indicator comprising a segment associated with each phase of flight of the flight plan;
    displaying a handle on the time scale;
    sliding the handle on the time scale in a first direction to view a future region; and
    sliding the handle on the time scale in a second, substantially opposite direction to view a previous region.

17. The method of claim 16, further comprising visually highlighting a segment of the flight phase indicator associated with a current phase of flight.

18. The method of claim 17, wherein the phases of flight comprise, in sequence: preflight, taxi, takeoff, cruise, descent, approach, taxi, and postflight.

* * * * *